US012652338B2

(12) United States Patent
Eng et al.

(10) Patent No.: US 12,652,338 B2
(45) Date of Patent: Jun. 9, 2026

(54) TARGETED CONTENT BASED ON DETECTED TRAITS

(71) Applicant: Comcast Cable Communications, LLC, Philadelphia, PA (US)

(72) Inventors: Adam Eng, Golden, CO (US); David A. Eng, Louisville, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 76 days.

(21) Appl. No.: 18/512,852

(22) Filed: Nov. 17, 2023

(65) Prior Publication Data

US 2025/0168243 A1 May 22, 2025

(51) Int. Cl.
| | |
|---|---|
| *G06F 15/16* | (2006.01) |
| *G06F 40/58* | (2020.01) |
| *H04L 67/306* | (2022.01) |
| *H04L 67/50* | (2022.01) |

(52) U.S. Cl.
CPC ............ *H04L 67/306* (2013.01); *G06F 40/58* (2020.01); *H04L 67/50* (2022.05)

(58) Field of Classification Search
CPC ........ H04L 67/306; H04L 67/50; G06F 40/58
USPC .......................................................... 709/201
See application file for complete search history.

(56) References Cited

U.S. PATENT DOCUMENTS

| | | | |
|---|---|---|---|
| 7,987,194 B1 | 7/2011 | Walker et al. | |
| 8,412,648 B2 | 4/2013 | Karypis et al. | |
| 9,773,498 B2 | 9/2017 | Stern et al. | |
| 9,785,632 B1* | 10/2017 | Beaven ..................... | G06T 3/02 |
| 9,911,398 B1* | 3/2018 | McQueen ............. | G06F 3/0481 |
| 11,741,996 B1* | 8/2023 | Ramesh .................. | G10L 13/02 |
| | | | 386/285 |
| 2013/0219417 A1* | 8/2013 | Gilson ............. | H04N 21/44218 |
| | | | 725/12 |
| 2017/0126609 A1* | 5/2017 | Sharifi .................... | G06F 9/451 |
| 2019/0205939 A1* | 7/2019 | Lal .......................... | G06N 3/045 |
| 2021/0233157 A1* | 7/2021 | Crutchfield, Jr. ....... | G10L 15/22 |
| 2024/0119477 A1* | 4/2024 | Best ................... | G06Q 30/0222 |

* cited by examiner

*Primary Examiner* — Alan S Chou
(74) *Attorney, Agent, or Firm* — Banner & Witcoff, Ltd.

(57) ABSTRACT

Systems, apparatuses, and methods are described for dynamically adjustable content based on detected traits. Dynamically adjustable content (e.g., advertisements, videos, announcements, location-specific information, maps, to name a few non-limiting examples) may be configured based on the determined traits of nearby users by performing character/word analysis of the names of nearby devices to determine likely associated user traits.

20 Claims, 16 Drawing Sheets

600A

| Received | | | Predicted | | |
|---|---|---|---|---|---|
| Device Name | Language | Location | Other | | Confidence |
| Günters Telefon | German | Germany | Unique German character "ü" | | 100% |
| Karl's Phone | English (US) | USA | German spelling of Karl | | 70% |
| EaglesFan_1 | English (US) | USA | Philadephia, Eagles fan | | 99% |
| Eugene Park | English (US) | USA | Korean last name | | 65% |
| SarahB89 | English (US) | USA | Woman | | 95% |
| TottenhamLad | English (UK) | UK | British soccer fan | | 100% |

| Language | Quantity |
|---|---|
| English (US) | 4 |
| German | 2 |
| English (UK) | 1 |
| Korean | 1 |

FIG. 6B

| Content | Brand | Genre | Language | Age | Gender |
|---------|-------|-------|----------|-----|--------|
| Beer ad | Heineken | Food/Drink | English | 21+ | - |
| Beer ad | Heineken | Food/Drink | German | 16+ | - |
| NFL ad | Eagles | Sports | English (US) | - | Likely Male |
| Ramyun ad | Shin | Food/Drink | English | - | - |
| Purse ad | Kate Spade | Accessories | English | - | Likely Female |
| Soccer ad | Premier League | Sports | English (UK) | - | Likely Male |

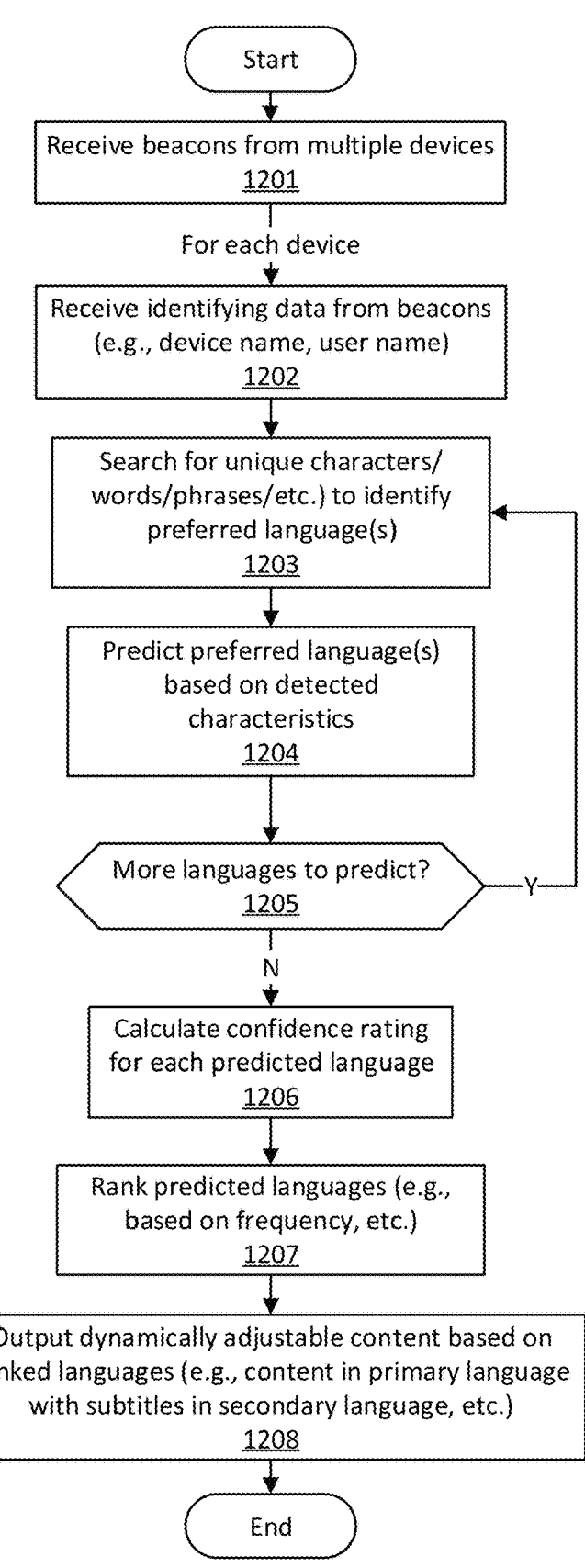

Start

Receive beacons from multiple devices
1201

For each device

Receive identifying data from beacons
(e.g., device name, user name)
1202

Search for unique characters/
words/phrases/etc.) to identify
preferred language(s)
1203

Predict preferred language(s)
based on detected
characteristics
1204

More languages to predict?
1205

Y

N

Calculate confidence rating
for each predicted language
1206

Rank predicted languages (e.g.,
based on frequency, etc.)
1207

Output dynamically adjustable content based on
ranked languages (e.g., content in primary language
with subtitles in secondary language, etc.)
1208

End

TARGETED CONTENT BASED ON DETECTED TRAITS

BACKGROUND

In locations where numerous people congregate (e.g., theme parks, shopping centers, transit stations, airports, parks, convention centers, sports arenas, etc.), it may be desirable to display or transmit content relevant to congregating people—advertisements, videos, announcements, location-specific information, maps, to name a few non-limiting examples. However, it is sometimes the case that content for display or transmission to people in close proximity to a location is not sufficiently targeted for those people. For example, the content might be in the wrong language or irrelevant to needs or interests of the proximate people. And such irrelevant content is likely to be confusing to and/or ignored by the people receiving the content. Improvements at delivering content are therefore needed.

SUMMARY

The following summary presents a simplified summary of certain features. The summary is not an extensive overview and is not intended to identify key or critical elements.

Systems, apparatuses, and methods are described for dynamically delivering adjustable content to a user or group of users based on detected traits in the user or group of users. Dynamically adjustable content (e.g., advertisements, videos, announcements, location-specific information, maps, etc.) may be configured based on the determined top languages and/or other traits of nearby users and may be transmitted at locations where large varieties of people congregate, such as theme parks, shopping centers, transit stations, airports, parks, convention centers, sports arenas, casinos, office buildings, billboards, and/or other locations. Configuration of the dynamically adjustable content may be based on determining the preferred spoken language and/or other traits of the nearby viewers, for example, by performing a character analysis of the names of the devices within range, with a lookup of the words to determine most likely language. User and/or devices characteristics such as device names, user names, device model, device identifiers, and/or other characteristics may be discoverable.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6A is a table showing example user traits predicted based on received data.

FIG. 6B is a table showing an example of rankings of detected traits based on frequency in a group.

FIG. 7 is a table showing example content items and their associated characteristics.

FIG. 12 is an example method for transmitting targeted content in a primary language with subtitles in a secondary language, based on detected traits.

DETAILED DESCRIPTION

Figure 1:
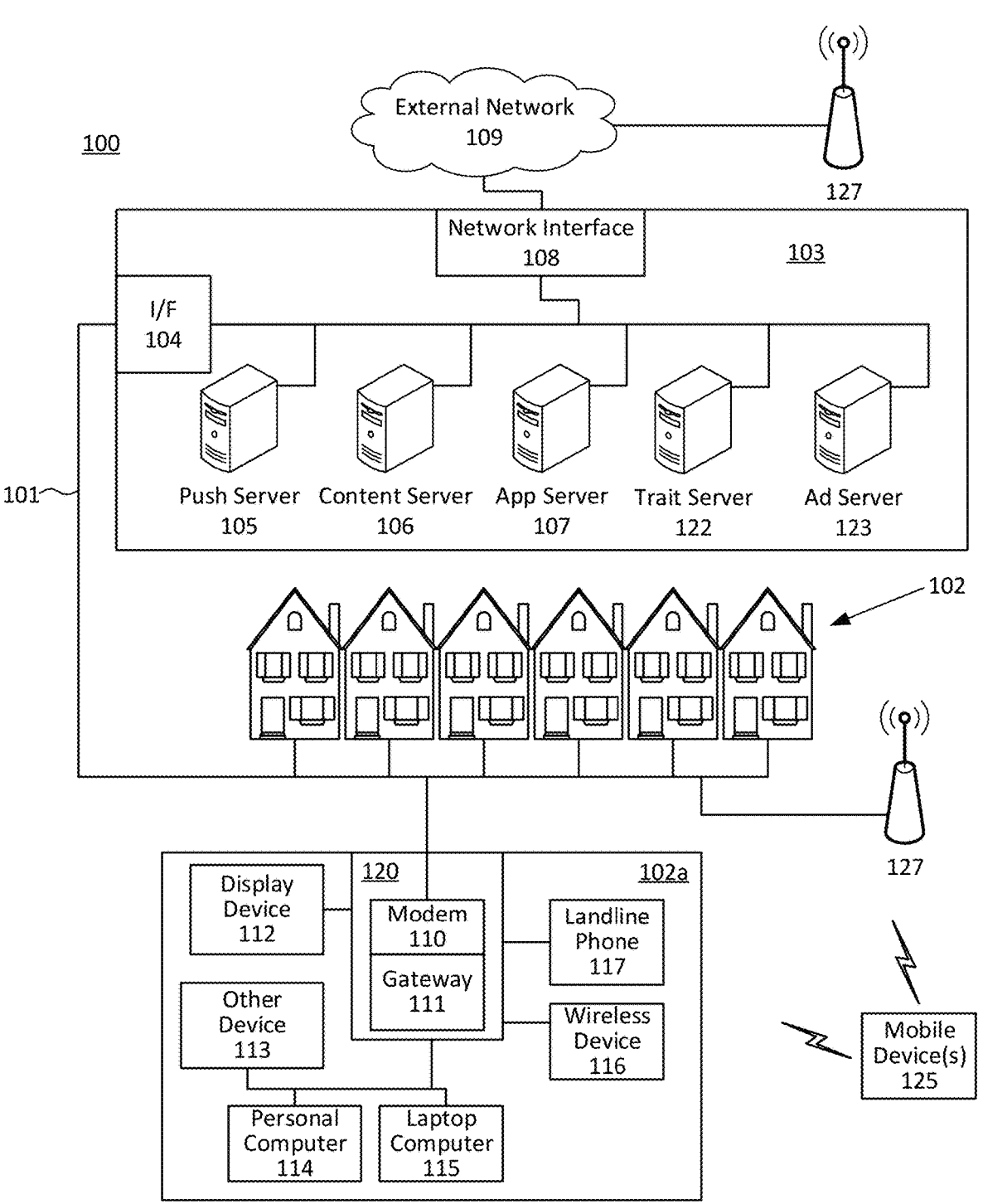
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122-123, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the trait server 122, the ad server 123, additional push, content, and/or application servers, and/or other types of servers.

The trait server 122 may be configured to determine and/or store user information based on detected traits. For example, the server 122 may be configured to store a predicted language based on detected characters in a device name. The ad server 123 may be configured to store and/or transmit advertisements based on predicted traits. Similarly, the content server 106 may be configured to transmit content based on the predicted traits.

Although shown separately, the push server 105, the content server 106, the application server 107, the trait server 122, the ad server 123, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g., Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
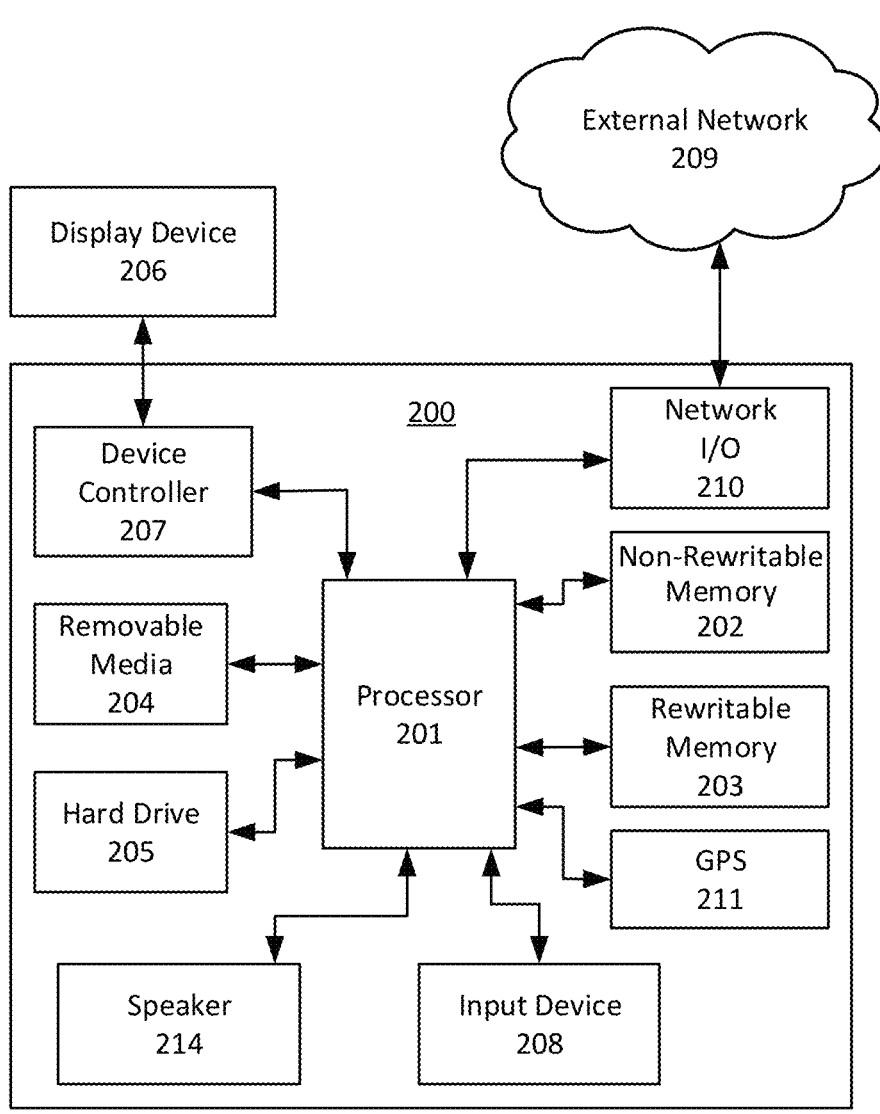
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
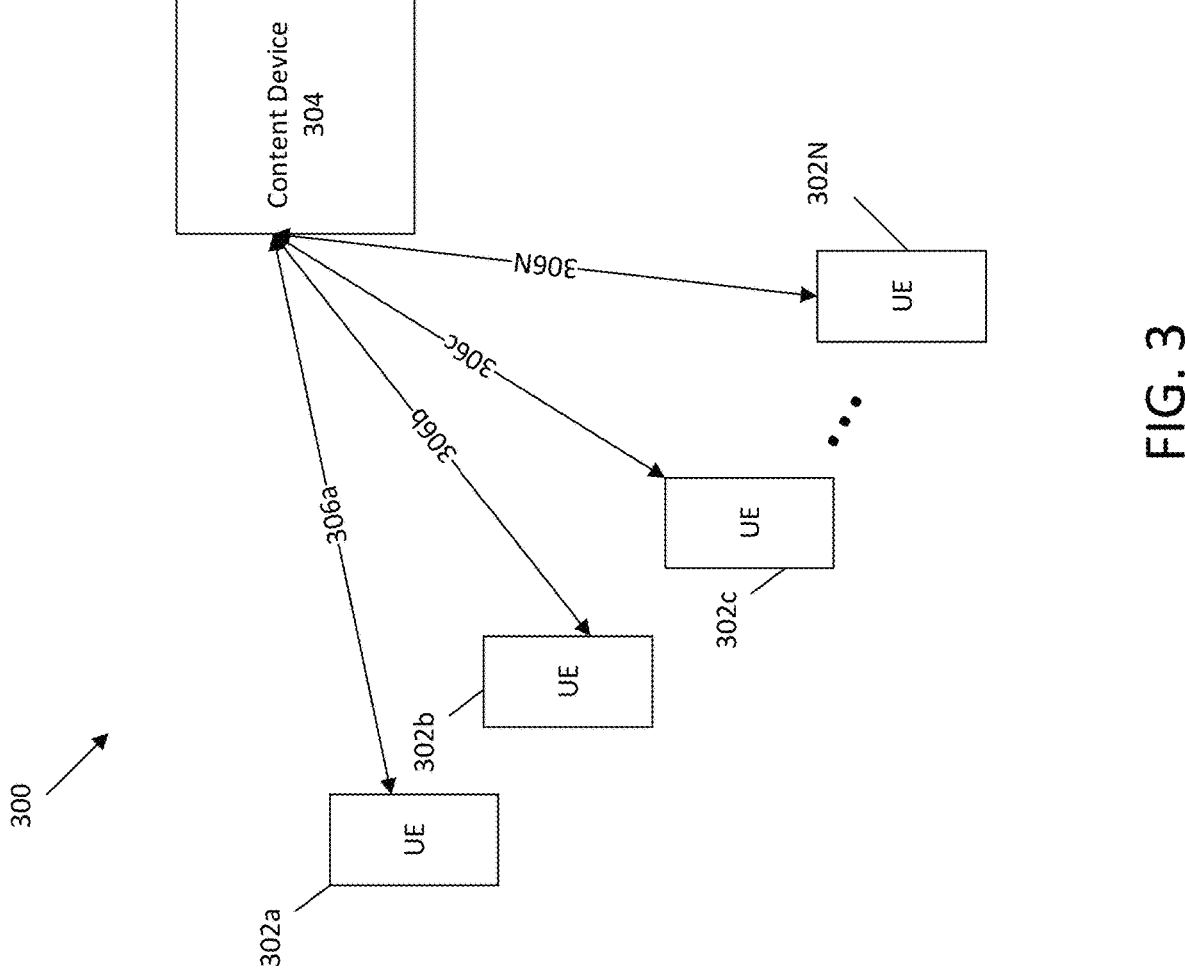
FIG. 3 shows an example environment with user devices and a content device.

We now refer FIG. 3, which depicts an example environment 300 relevant to embodiments of this disclosure. As shown in FIG. 3, environment 300 includes an arbitrary number of user devices 302*a*, 302*b*, 302*c*, . . . , 302N (collectively referred to herein as user devices 302), which configured to communicate with content computer 304 via a number of communication connections (e.g., 306*a*, 306*b*, 306*c*, . . . , 306N, collectively referred to herein as communication connections 306). According to the various embodiments of this disclosure the communication connections may comprise any suitable wireless communication means such as WiFi, Bluetooth, Wireless Local Area Network (WLAN), Zigbee, etc. Furthermore, the user devices 302 may comprise any sort of suitable user device such as computers, smart phones, tablets, wearable devices, headphones, smart eyewear, etc. According to some embodiments, the content device 304 is tasked with generating and/or configuring content for the users associated with the user devices 302. Additionally, content device 304 may comprise one or more wireless access points (such as wireless access points 127, described above with respect to FIG. 1) and be in communication with a local office (e.g., local office 103) via communication links (e.g., communication links 101). Delivery of content to users of the user devices 302 may occur a number of different ways. For example, in some instances, the content may be delivered by displaying it on a billboard, electronic sign, television, video monitor, kiosk, or the like for users in the proximity. Alternatively, the content device 304 may deliver content to the users of the various user devices 302 directly via communication connections 306.

According to various embodiments, the dynamically adjustable content (e.g., advertisements, videos, announcements, location-specific information, maps, etc.) for a particular environment (e.g., environment 300) may be configured based on the determined top languages and/or other traits to host information in may be based on real-time identification, for example, of viewers (e.g., users of user devices 302) in close proximity. Such dynamically adjustable content may be transmitted at locations where large varieties of people congregate, such as airports, train stations, shopping malls, theme parks, billboards, and/or other locations. The dynamically adjustable content may be adjusted based on a number of different attributes of a user or group of users. For example, content may be adjusted based on determining the preferred spoken language and/or other traits of the nearby viewers. In some embodiments, a preferred spoken language or other traits of a user or group of users can be inferred by performing a character analysis of the names of the devices within range, with a lookup of the words to determine most likely language. User and/or devices characteristics such as device names, user names, device model, device identifiers, and/or other characteristics may be discoverable.

Consider, for example, the environment of FIG. 3 where device 302*a* is a Bluetooth device within range of a transmitting device and is named "Günters Telefon." The content device 304 may use a lookup table to determine that "Günter" is a traditional German name, the u-umlaut appears in the German alphabet, and the word Telefon is "phone" in German. As a result, a preferred spoken language of the user of user device 302*a* may be determined to be German. Similarly, if there are, for example, 20 Bluetooth devices in range, and 15 of them are determined to be in Spanish, while 5 are determined to be in English or non-identifiable, the dynamically adjustable content may be transmitted in Spanish, subtitled in English.

As described herein, users may receive customized content (e.g., dynamically adjustable content) independently of advanced authorization of nearby devices based on sharing information, for example, via beacons. Using beacons, devices may share generic profile such as: a user's primary/secondary/etc. languages, the user's gender, and/or other traits. Users may opt-in to share information. Beacons may transmit include user identifiers (e.g., device ID, usernames) so users may be shown various dynamically adjustable content items.

As described herein, confidence intervals may be used to indicate confidence levels that the predicted traits have been identified correctly. For example, a confidence interval may be of a greater value based on beacons from multiple sources (e.g., WiFi beacon, Bluetooth beacon, etc.) and/or multiple devices (e.g., a user's smartphone and smart watch, etc.) indicating a user's traits.

Figures 4A, 4B:
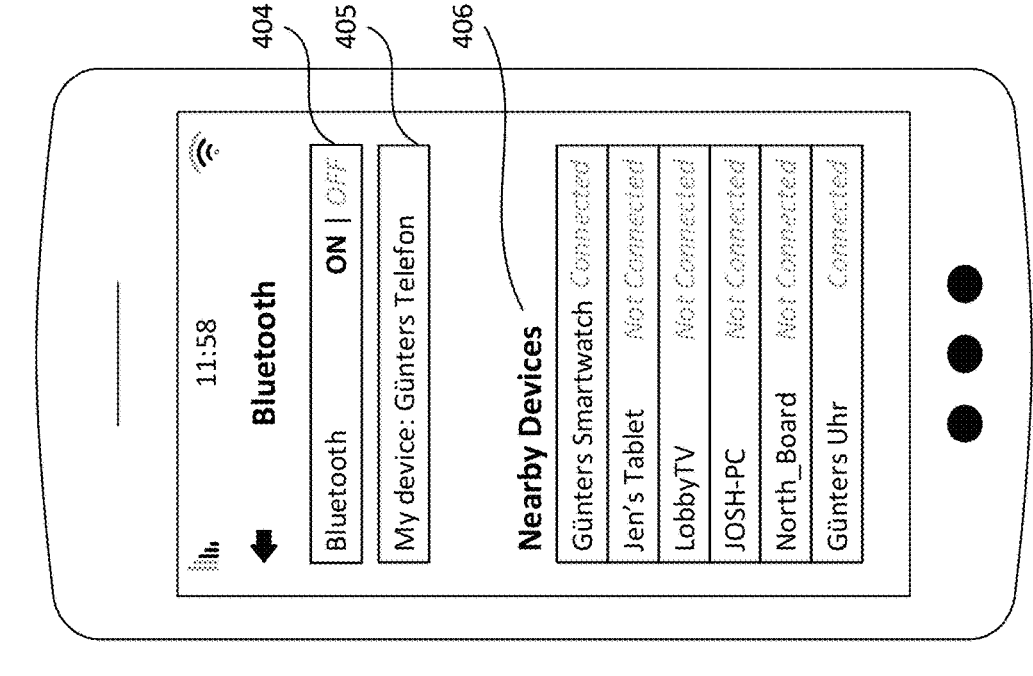
FIGS. 4A, 4B, and 4C show examples of user devices interfaces indicating user traits.
Figure 4C:
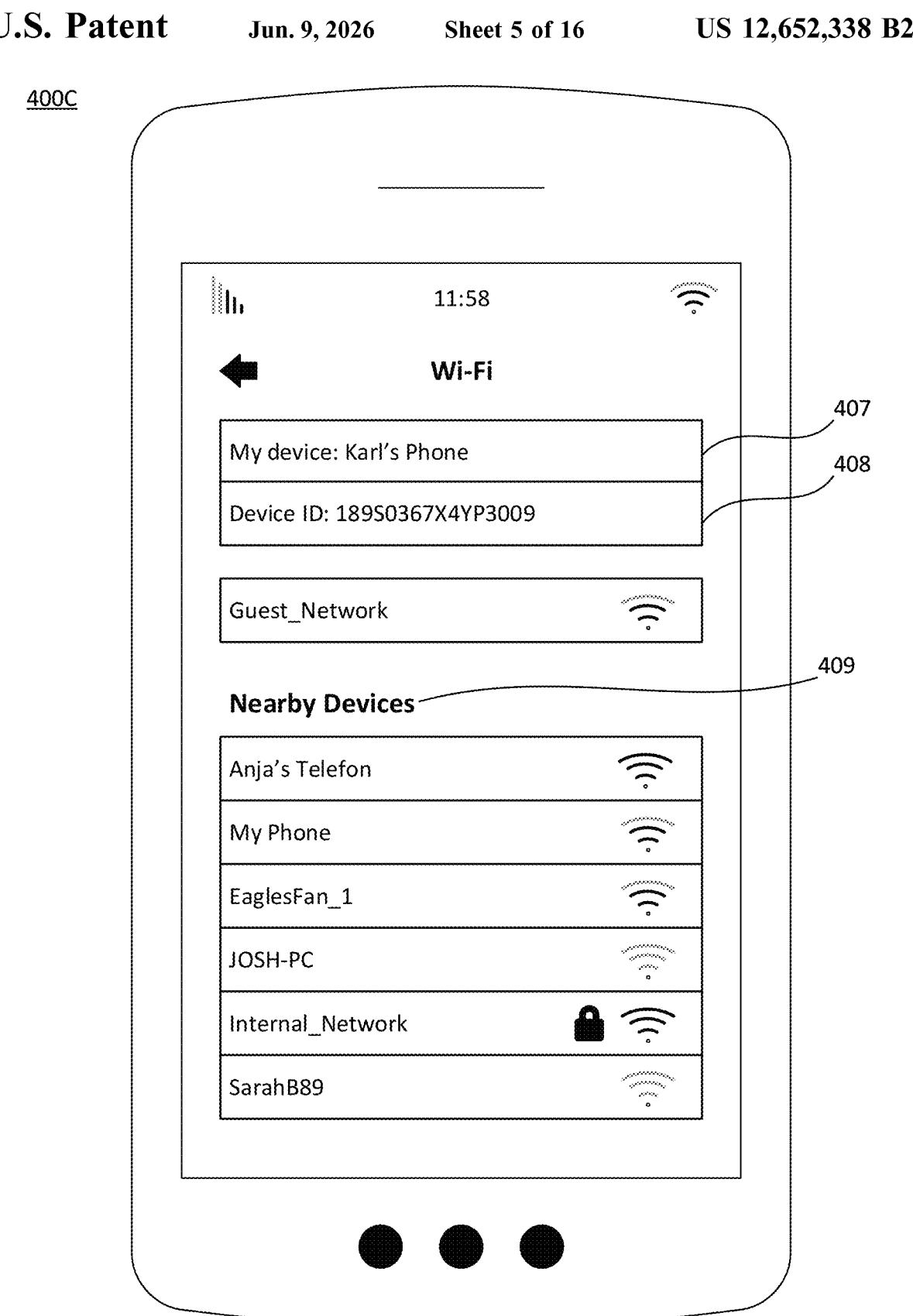

FIGS. 4A, 4B, and 4C show examples of user devices interfaces indicating user traits. The user traits may be transmitted to nearby devices and/or to remote devices, for example, via a handshake protocol establishing communications between the devices. A device's MAC address may indicate identifying information about the user and/or the device. The first 24 bits of the MAC address of a network-connected device, known as the Organizational Unique Identifier (OUI), indicate a vendor for the device, which may indicate, for example, a region/location in which that device is used. The user traits and/or other information may be stored in devices such as the trait server 122. FIG. 4A shows an example device 400A showing wireless traits, including a WiFi device name 401, connected networks 402, and nearby devices 403. FIG. 4B shows an example device 400B showing Bluetooth settings. Bluetooth connection status 404, a Bluetooth device name 405, and nearby Bluetooth devices 406. FIG. 4C shows an example device 400C belonging to an example user Karl. Karl's device transmits to nearby devices a device name "Karl's Phone" 407, a device ID number (e.g., a serial number, IMEI, etc.), and nearby WiFi devices 409. Device names, connected networks, and/or device identifiers may be easily discoverable by nearby devices. User devices may transmit beacons comprising the information of FIGS. 4A-4C in combination with other information.

Figure 5:
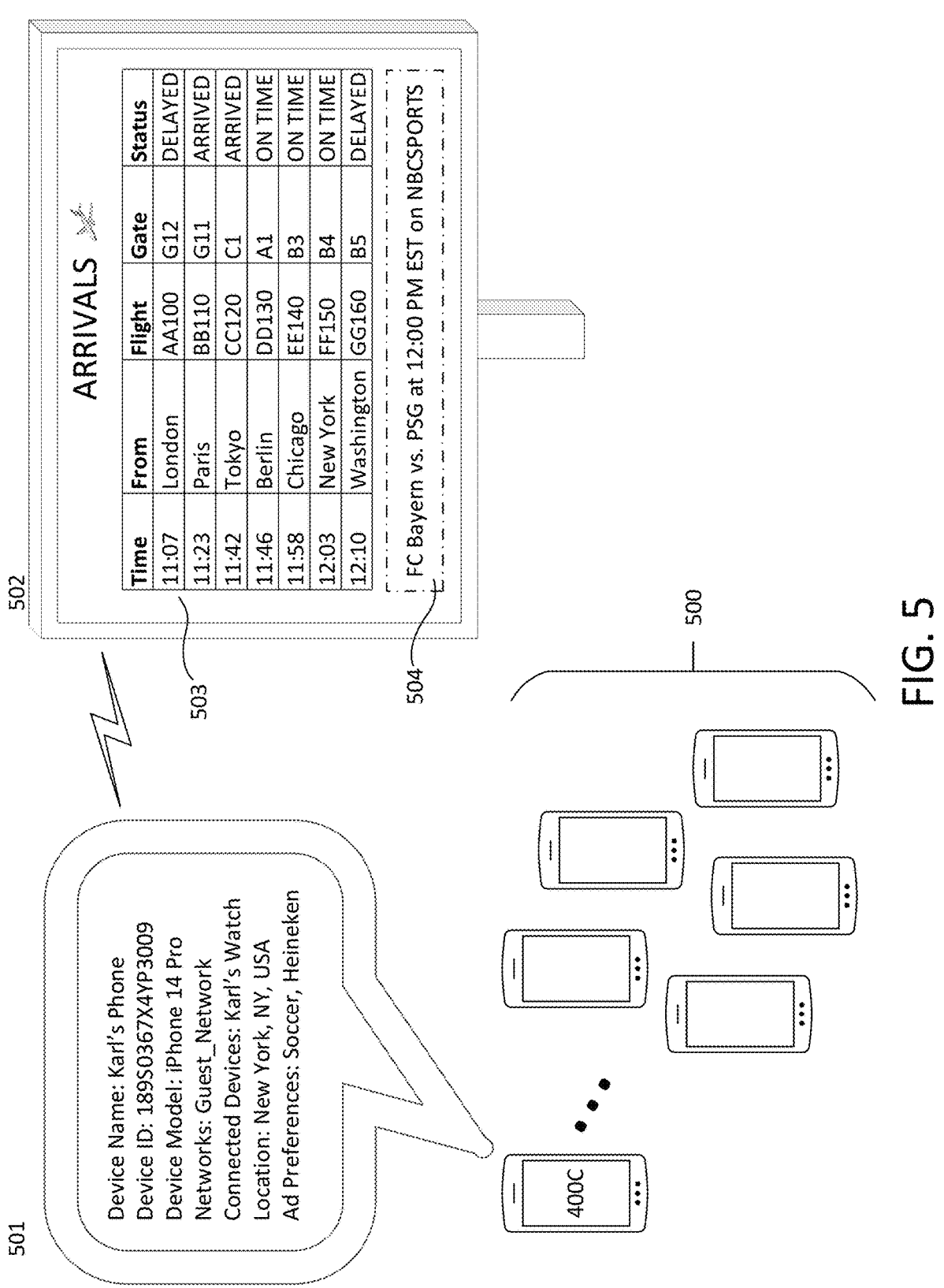
FIG. 5 shows an example of an information beacon transmitting user traits to a nearby device.

FIG. 5 shows an example of an information beacon transmitting user traits to a nearby device. User devices 500 may comprise devices transmitting information beacons and/or devices transmitting limited information (e.g., device names and identifiers, etc.). The user devices 500 may include the device 400C, which, for example, may transmit a beacon 501 indicating: a device name, device ID, device model, connected networks, connected devices, location (e.g., current and/or registered locations), ad preferences, and/or other information. Users may opt into sharing their beacon information via the beacon 501 with other users and/or devices. The information contained in the beacon 501 may be received by a device 502 (e.g., a walk-up interface such as an airport arrivals board). The device 502 may transmit and/or display content 503 such as flight arrival times. The device 502 may also transmit and/or display dynamically adjustable content such as an advertisement 504, which may be adjusted based on the beacon 501. One or more of the user devices 500 may transmit beacons such as the beacon 501.

FIG. 6A is a table 600A showing example user traits predicted based on received data. The table of FIG. 6A may comprise information indicating detected traits and characteristics predicted based thereupon. For example, an interface device may receive the device name "Eugene Park." Based on the characters used in the name, the user's primary language may be determined to be English (US), and their location may be determined to be the USA. Other characteristics determined based on the device name may include a secondary language (e.g., Korean), which may be determined based on identifying "Park" as a common Korean family name. A confidence interval may be assigned to one or more of the predicted characteristics. According to various embodiments, the confidence interval may correspond to a number of pieces of evidence in the received data that point to a particular trait. For example, if the device name, ad preferences, and device location all indicate a German user, then the confidence interval may indicate a higher confidence than if only one of the pieces of evidence (e.g., device name) indicated German. Such an example is depicted in FIG. 6A, where "Gunter's Telefon" in the first line of table 600A is shown to have a confidence of 100% because it has indicated that its language is German, location is Germany, and that it contains the German character "u" with a German umlaut whereas "Karl's Phone" in the second line has only one piece of evidence indicating that it might be German—the German spelling of the name Karl. As such, "Karl's Phone" only has a 60% confidence interval. Another example from FIG. 6A shows, a confidence of 65% may be assigned to the prediction of English as the primary language and Korean as the secondary language for the device "Eugene Park." Korean may be the primary language and American English may be the secondary language of the user. The table 600A may be a lookup table which is accessed when determining how to modify the dynamically adjustable content to be output to users. Based on the type of data stored in the table 600A, for example, such as detected characteristics (e.g., device name), predicted traits (e.g., language, location, others) based on those characteristics, and confidence ratings for the predicted traits, a display device (e.g. the content device 304) may more accurately output content appealing to a larger proportion of users.

FIG. 6B is a table 600B shows the number of individuals who have been deemed to prefer a particular language in a group of users with user devices in a location. As shown in the example of FIG. 6A, English is associated with five of the six users (with US English associated with five users and UK English associated with one user), German is associated with two of the six users, and Korean with one of the six users. The overlapping languages may be determined based on users having overlapping primary and secondary languages. For example, Karl's primary language may be English and his secondary language may be German, where Eugene's primary language may be English and his secondary language may be Korean; therefore, both may be counted towards English. The dynamically adjustable content may be transmitted in English with German subtitles, for example, to reach the greatest potential number of viewers based on ranked predicted languages. Based on the rankings of table 600B, the dynamically adjustable content may be configured to be transmitted in the highest-ranked language with subtitles and/or substitute content transmitted in the lower-ranked languages. The table 600B may be a lookup table used in determining how to output content using one or more predicted traits, for example, a primary language and a secondary language of an audience in order to appeal to a larger proportion of users. In some cases, where there may be users with different dialects of the same language in a group (e.g., US English and UK English in the table 600B), they may be treated as one primary language and/or as a primary and secondary language based on their rankings. The tables 600A-600B of FIGS. 6A-6B may be stored in the trait server 122.

FIG. 7 is a table 700 showing example content items (e.g., dynamically adjustable content) and their associated characteristics. An advertisement, for example, for Heineken beer may be stored in the ad server 123 in multiple languages and/or for multiple target audiences. The advertisement targeted at Americans may be in English and may be limited to users aged 21 and up. For German viewers, the advertisement may be in German and be limited to users aged 16 and up, based on the local drinking age. Similarly, advertisements for certain types of content may be determined to be attractive to a majority of user types, for example, NFL ads may be determined to be attractive to a majority male audience. The dynamically adjustable content may be configured based on the characteristics of the table 700 among others. For example, a content device (e.g., the content device 304) may output to Karl, who in table 600A is determined to use German, a Heineken beer ad in German. Similarly, Eugene Park may receive the Heineken ad in English in addition to the Shin Ramyun ad, for example, since he is determined to be an English speaker with a Korean last name in table 600A.

Figure 8A:
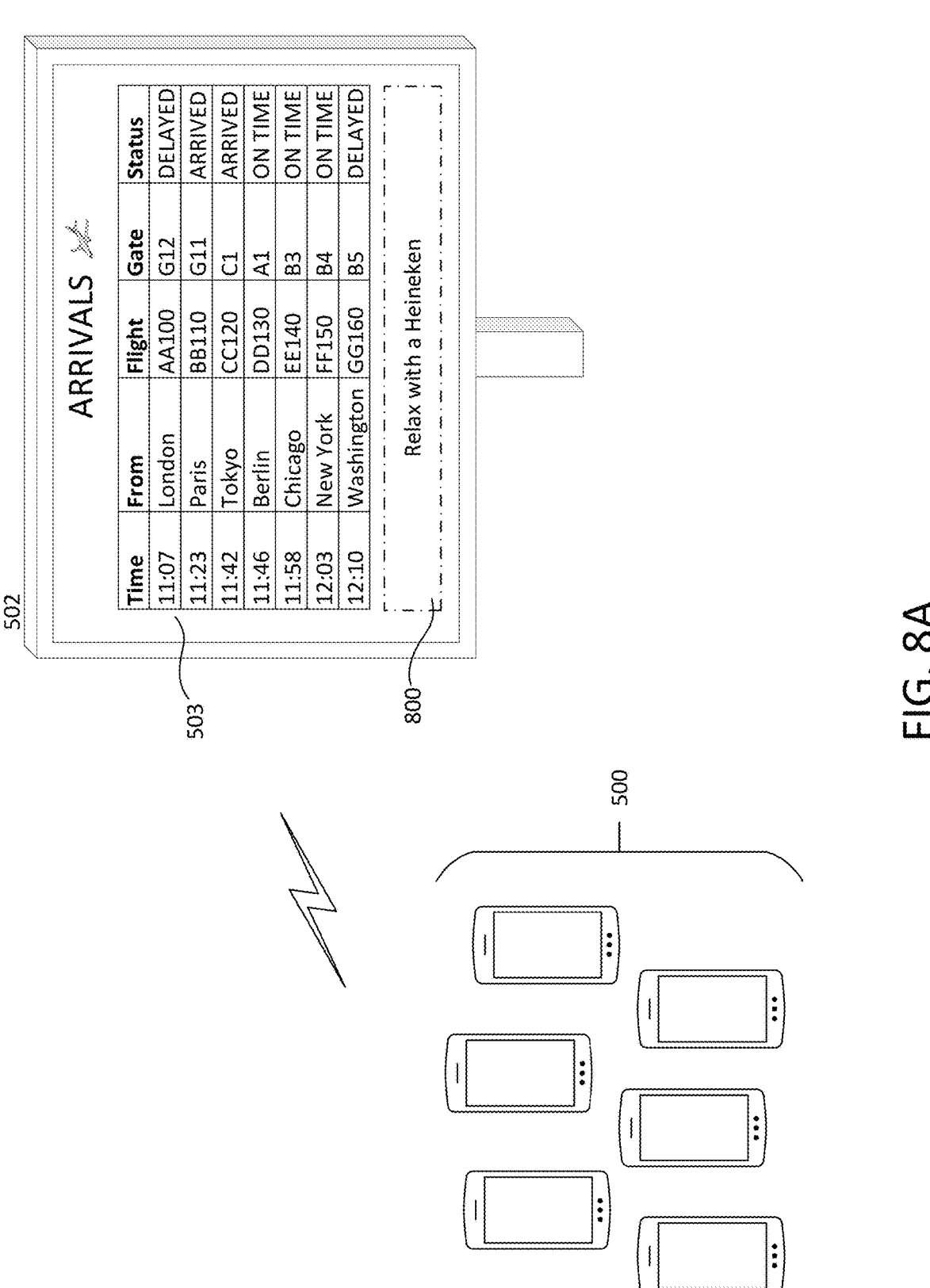
FIGS. 8A and 8B show examples of content transmitted to devices based on predicted traits.
Figure 8B:
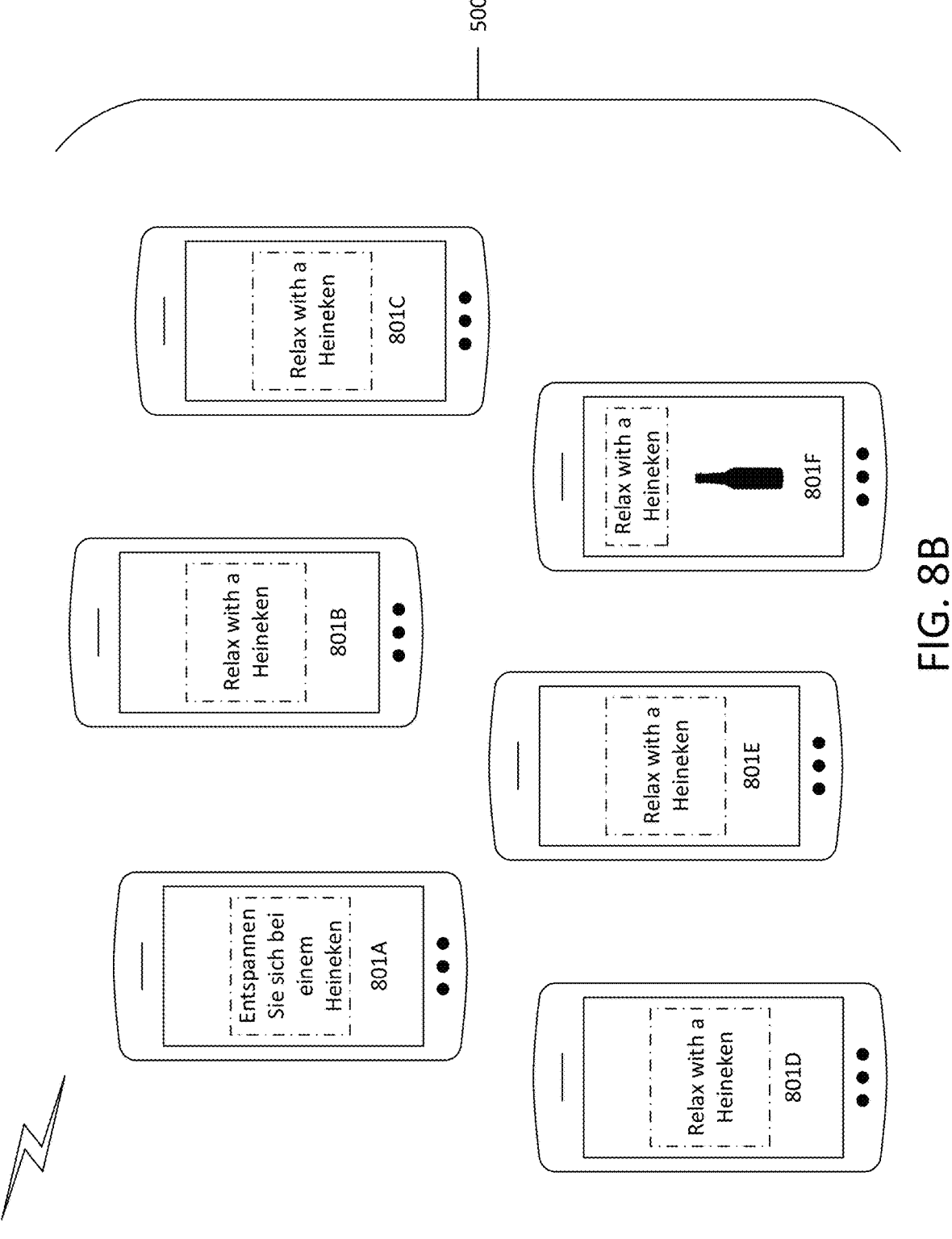

FIGS. 8A and 8B show examples of content transmitted to devices based on predicted traits. The transmitting may comprise displaying content on a display device such as the content device 304 and/or sending content to user devices such as the user devices 302. FIG. 8A shows the user devices 500, the device 502, and the content 503. The device 502 may transmit a dynamically variable advertisement 800 to nearby viewers. The advertisement 800 "Relax with a Heineken" may be configured to transmit in English, the highest-ranked language of the nearby users (as described for the examples of FIGS. 6A-6B). FIG. 8B shows a zoomed in view of the user devices 500. Based on detected traits, the dynamically adjustable ads 801A-801F may be transmitted to the user devices 500. The dynamically adjustable ad 801A may be transmitted to Günter's device in German based on the high-confidence determination that his primary language is German. The dynamically adjustable ads 801B-801E may be transmitted in English based on English being determined as the primary language for those users. The dynamically adjustable ad 801F may be transmitted pictographically and in English for Eugene's device based on the lower-confidence determination that his primary language is English, as described herein relating to FIG. 10.

Although these examples have described transmission of advertisements in various languages based on detected traits from device names, these examples are not intended to be limiting. Other factors of dynamically adjustable content may be configured based on various predicted traits.

Figure 9:
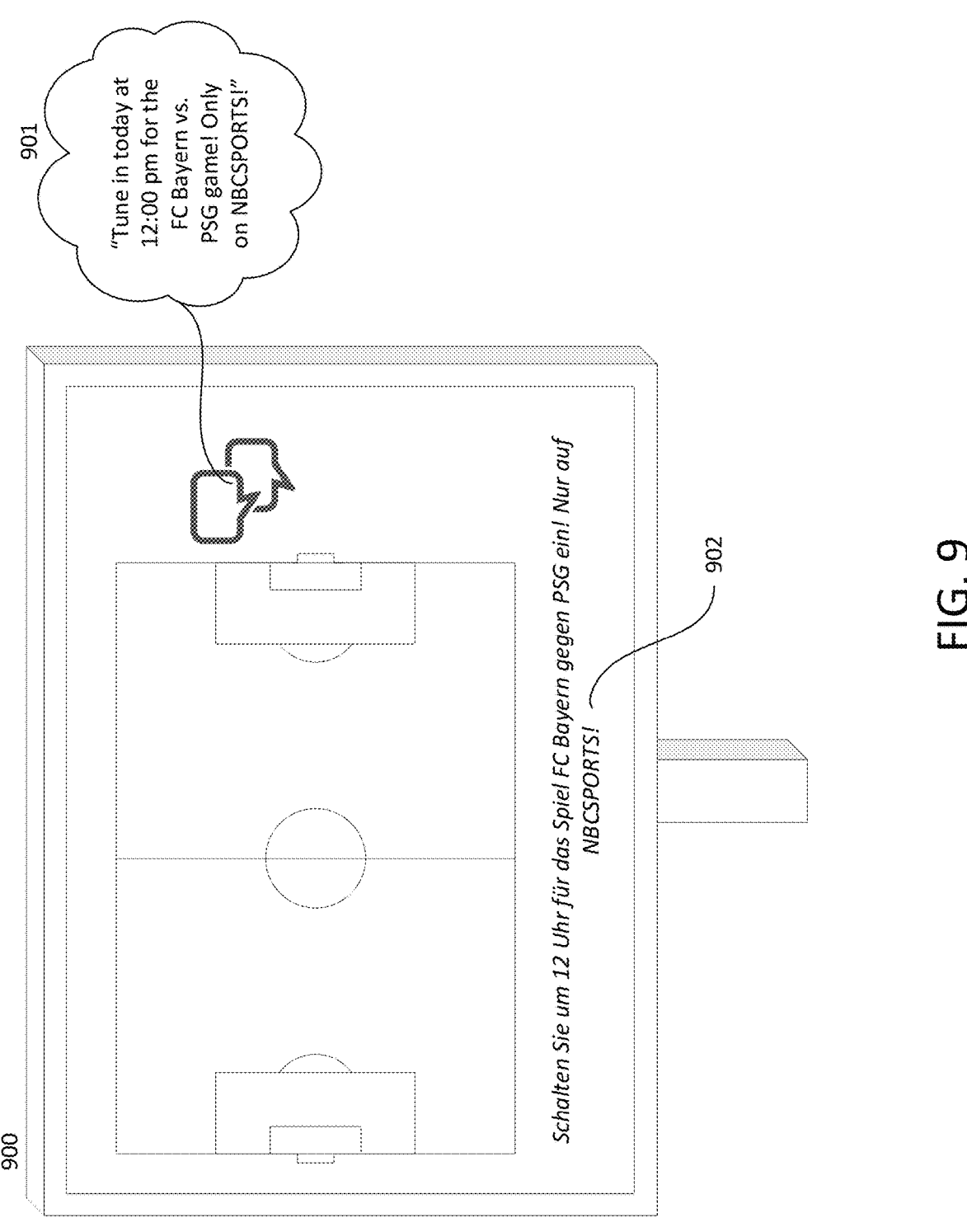
FIG. 9 shows an example of content transmitted in a primary language with subtitles in a secondary language, based on detected traits.

FIG. 9 shows an example of content transmitted in a primary language with subtitles in a secondary language, based on detected traits. Dynamically adjustable content may be transmitted in a primary language with subtitles in a secondary language based on rankings of predicted languages among nearby users. An interface 900 may show an ad for an upcoming soccer game with the English audio 901 "Tune in today at 12:00 pm for the FC Bayern vs. PSG game! Only on NBCSPORTS!" If German is determined to be the next highest-ranking language among the nearby users, the ad may be transmitted with German subtitles 902, as described herein relating to FIG. 12.

Figure 10:
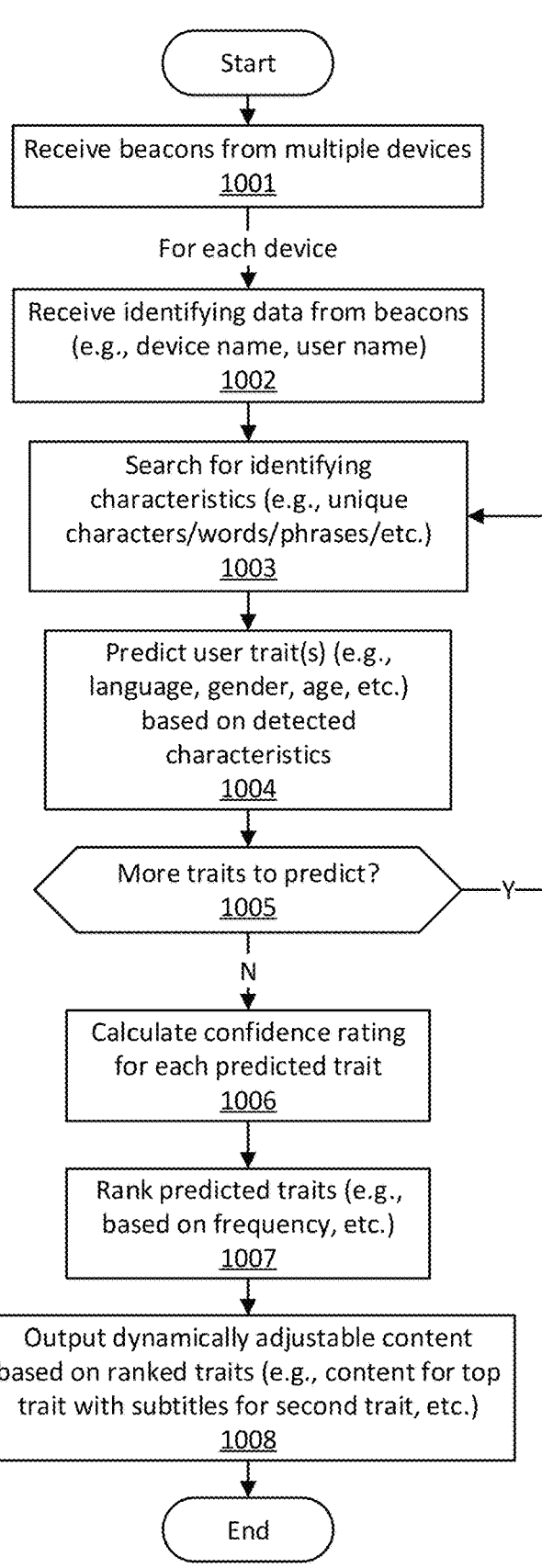
FIG. 10 is an example method for predicting traits based on detected characteristics.

FIG. 10 is an example method 1000 for predicting traits based on detected characteristics. At 1001, beacons from one or more devices may be received (e.g., multiple user devices 302). At 1002, for each of the devices, identifying data (e.g., device name, user name, etc.) may be detected from the received beacons. At 1003, the detected data may be searched for identifying characteristics (e.g., unique characters/words/phrases that may indicate a particular language, interest, and/or other trait, etc.). At 1004, user traits may be predicted based on the characteristics detected in the identifying data. At 1005, a determination is made as to whether more traits should be predicted. In the case of a "Yes" determination, 1003 may be implemented. In the case of a "No" determination, at 1006, a confidence rating may be determined for the predicted traits. The confidence rating may be based on the number of detected characteristics (e.g., "Günters Telefon" includes the u-umlaut, the German spelling of "telephone", and the German possessive without an apostrophe; the combination of the three factors may result in a high confidence rating that Günter's primary language is German). At 1007, the predicted traits may be ranked, for example, based on frequency as in the table 600B. At 1008, dynamically adjustable content may be output based on the ranked traits (e.g., content for the top trait may be output with subtitles and/or secondary content for the second-ranked trait). In areas with multiple user devices (e.g., environment 300), for example, user device identifiers (e.g., device name, user's name, etc.) may be detected and device/user characteristics (e.g., device language, user gender, etc.) may be predicted based on detected traits. The predicted characteristics may be determined based on: detecting unique characters (e.g., umlauts, etc.), detected preferred languages based on words and/or phrases in device identifiers, and/or detecting user gender based on identifying common gendered names. Dynamically adjustable content may be transmitted based on predicted languages and other user characteristics, for example, if most devices are detected to be in language A and some in language B, a video advertisement in language A may be transmitted with subtitles in language B. Other user characteristics may be shared via beacons transmitted by user devices (e.g., users may opt-in to share further information than just device name, etc.). The language detection system may default to a preset language (e.g., local primary language) or to a pictographic model, for example, if not enough information is provided to determine the primary language (or if confidence interval below a certain threshold). A priority score may be assigned based on signal strength, confidence of preferred language, number of connections, and how many other signals are in range.

Figure 11:
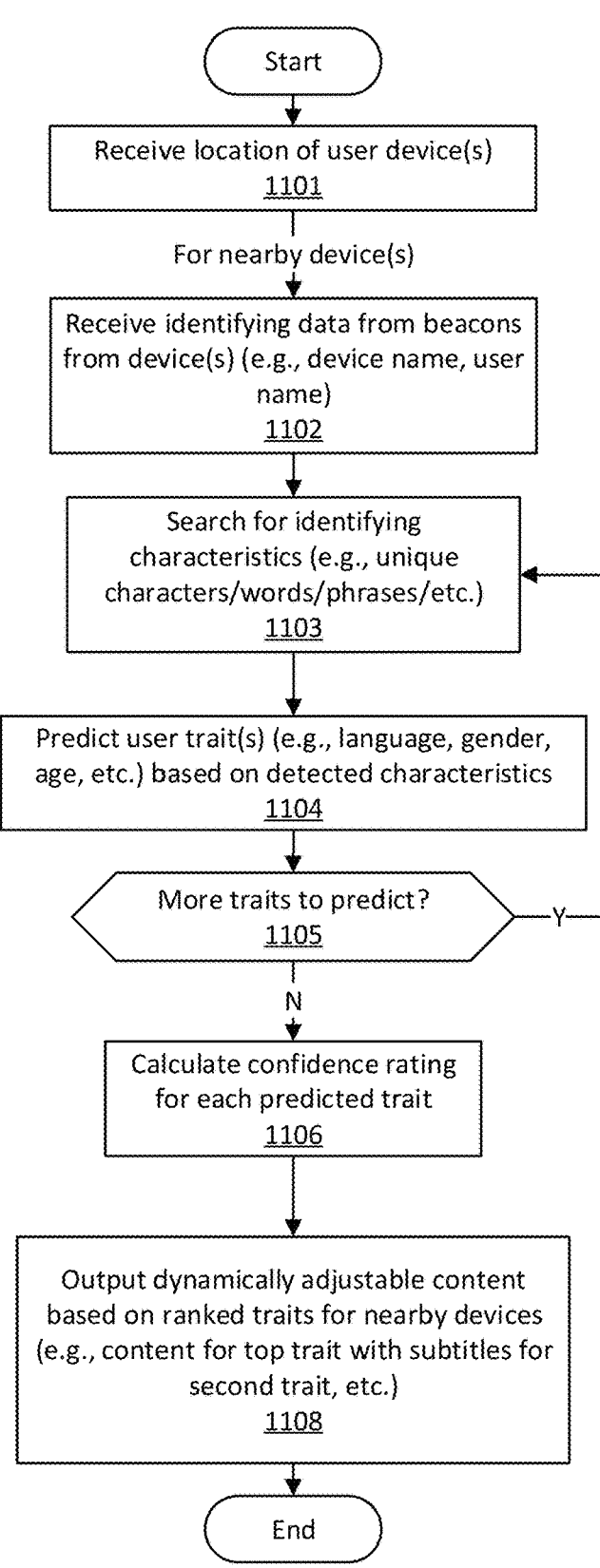
FIG. 11 is an example method for transmitting targeted content based on detected traits and location.

FIG. 11 is an example method 1100 for transmitting targeted content based on detected characteristics and location. Dynamically adjustable content may be transmitted based on proximity of users to a device. At 1101, one or more locations of user devices may be received. At 1102, identifying data (e.g., device name, user name, etc.) may be received from user device beacons. At 1103, the identifying data may be searched for identifying characteristics that may indicate a trait (e.g., unique characters/words/phrases/etc. that may indicate a location of a user). At 1104, user traits may be predicted based on the detected characteristics. For example if a user is missing from a gate/terminal, their location may be determined based on where their device is detected (e.g., if John Smith is missing from Gate 12 at boarding, and the device "John Smith's Phone" is found within range of sensors at Gate 22, the nearby screen may be changed to display the current gate and the boarding time for John's flight so that he can see where he needs to go). A user's location relative to a device (e.g., a walk-up interface) may be determined via the signal strength of the user's device (e.g., via the Bluetooth signal strength, since Bluetooth is omnidirectional). At 1105, a determination is made as to whether there are more traits to predict. In the case of a "Yes" determination, 1103 may be implemented. In the case of a "No" determination, at 1106, a confidence rating may be determined for the predicted traits. If many users surround a walk-up interface device, for example, the interface may be configured to identify the users facing the screen in order to display the most relevant content (e.g., via multiple antennae/sensors within the interface device). Based on MAC addresses (and/or other identifying info) of user devices, providers may track users' ad preferences, which can be used to transmit targeted advertisements to users walking past interfaces. At 1107, dynamically adjustable content may be output based on traits for nearby devices (e.g., content for top trait with subtitles/secondary content for second trait, etc.).

Also or alternatively, the dynamically adjustable content may be configured based on locations of users. For example, as users enter a stadium, the stadium may detect, based on a user's shared information (e.g., via public profile, beacon, etc.), which team is the user's favorite team and transmit scores, replays, targeted advertisements, etc. based on the detected characteristics. For example, depending on where users are sitting in stadiums (e.g., across from certain screens), ads may be transmitted in users' primary language based on which users are sitting in a predetermined range (e.g., based on who is facing/looking at which monitors in the stadium). User locations may be triangulated based on base station information, and content may be transmitted in the users' languages based on their determined locations.

FIG. 12 is an example method 1200 for transmitting targeted content in a primary language with subtitles in a secondary language, based on detected traits. Dynamically adjustable content may be configured based on the predicted language of nearby users. Subtitles at a movie theater, for example, may be configured for the most common primary language (e.g., if the majority of viewers are primary Spanish speakers, Spanish subtitles may be shown). In a sports bar with multiple displays, for example, based on a user's primary language (or favorite team, other information shared via a beacon, etc.), subtitles for their favorite team's currently airing game and/or current scores may be transmitted to the user's device. At 1201, beacons from one or more devices may be received. At 1202, identifying data (e.g., device name, user name) based on beacons may be received. At 1203, the identifying data may be searched for unique characters/words/phrases that may indicate a particular language. At 1204, a preferred language may be predicted based on detected characteristics. At 1205, a determination is made as to whether there are more languages to predict (e.g., secondary/tertiary/etc. languages as discussed for the table 600A). In the case of a "Yes" determination, 1203 may be implemented. In the case of a "No" determination, at 1206, a confidence interval may be determined for the predicted languages. At 1207, the predicted languages may be ranked, for example, based on frequency, as shown in the table 600B. At 1208, dynamically adjustable content may be output based on the ranked languages (e.g., content in primary language with subtitles in secondary language). For example, an advertisement may be output in English with subtitles in German, as shown in FIG. 9.

Figure 13A:
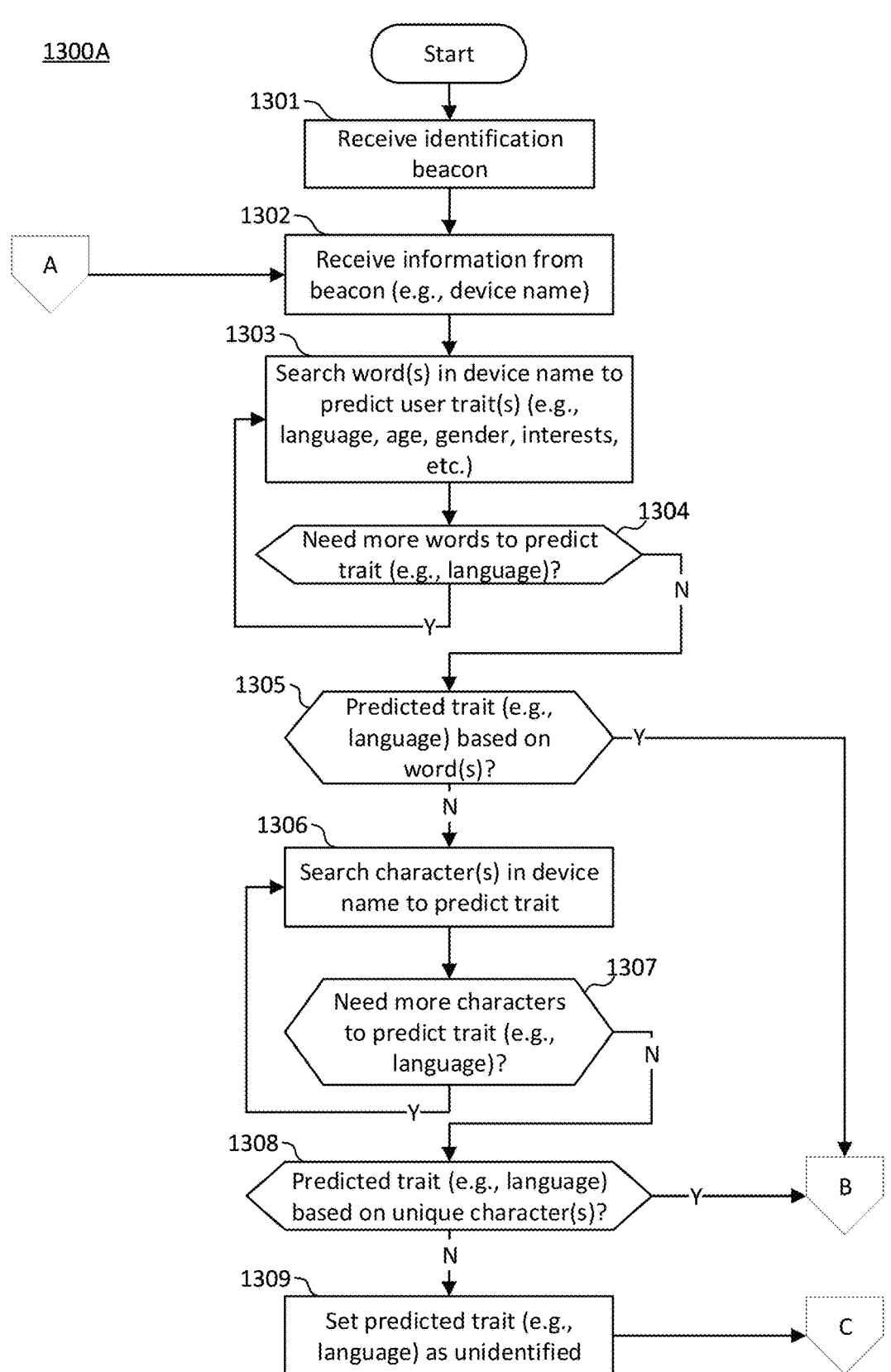
FIGS. 13A-13B are an example method for transmitting targeted content based on detected traits.
Figure 13B:
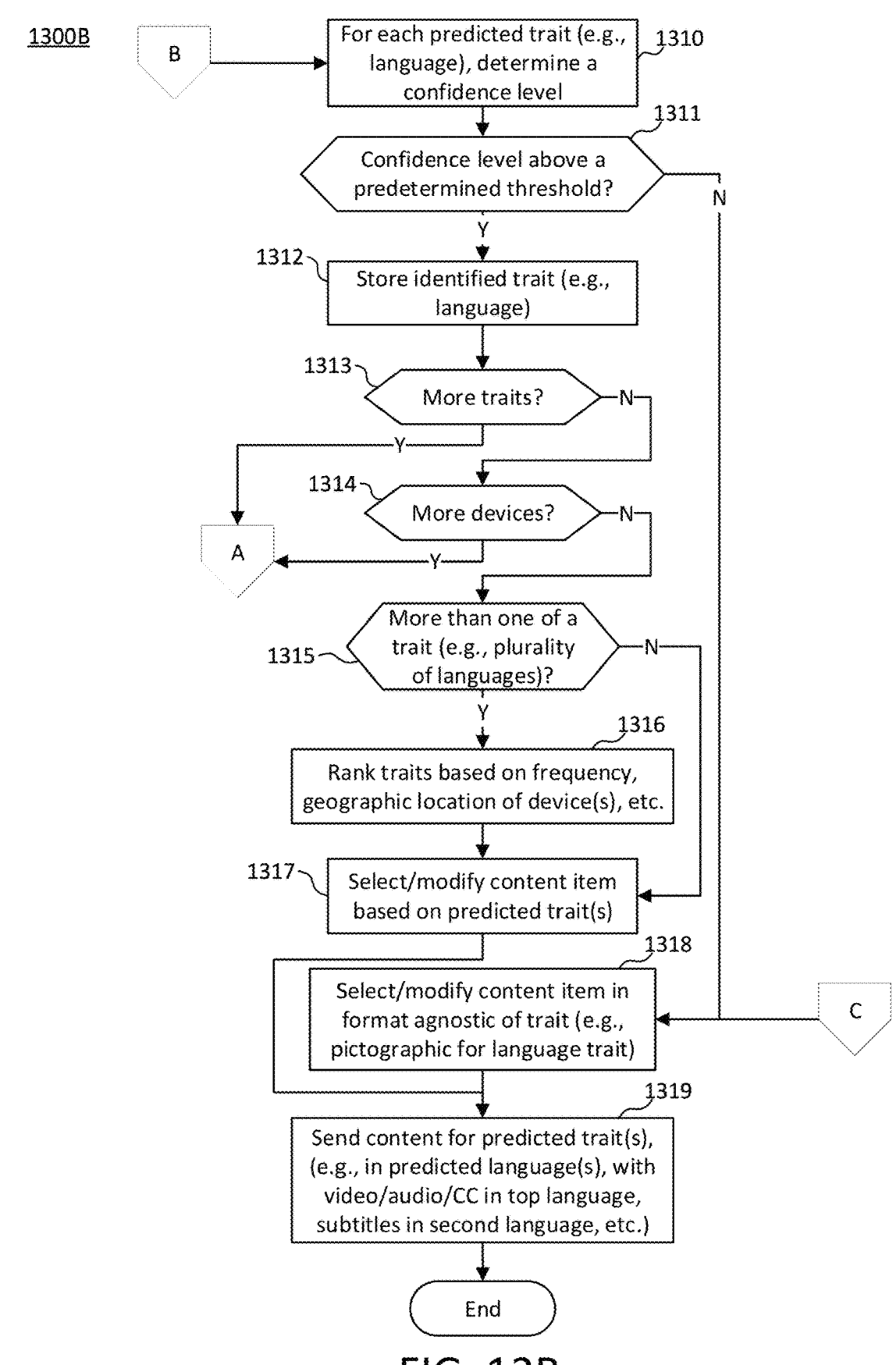

FIGS. 13A-13B are an example method 1300 for transmitting targeted content based on detected traits. The method is described with respect to the above-described figures. However, it should be understood that the method 1300 is not limited to these specific embodiments. At 1301, an identification beacon may be received. For example, a device 502 may receive the beacon 501 from one or more of the devices 500. The data of the beacon 501 may be stored in the trait server 122. At 1302, information from the beacon may be received. For example, the device name "Günters Telefon" may be received. At 1303, detected words from device name may be searched to predict a user's traits. For example, the user's language, age, gender, interests, and/or ad preferences may be predicted. At 1304, a determination is made as to whether more words/data should be analyzed in order predict the user's trait. In the case of a "Yes" determination, 1303 may be implemented to search more information from the identification beacon to predict the user trait. In the case of a "No" determination, at 1305, a determination is made as to whether a trait can be predicted based on the analyzed words. In the case of a "Yes" determination, at 1310, a confidence level may be determined for the predicted trait. In the case of a "No" determination, at 1306, characters in the device name may be analyzed to predict the user trait. For example, the device name "Günters Telefon" contains a u-umlaut character which is used in the German language. "Telefon" is the German spelling of "telephone." Based on identifying a unique character and a word used in the German language, "Günters Telefon" may be determined to belong to a user whose primary language is German. At 1307, a determination is made as to whether more characters need to be analyzed in order to predict the use trait. In the case of a "Yes" determination, 1306 may be implemented. In the case of a "No" determination, at 1308 a determination is made as to whether a trait can be predicted based on the analyzed characters. In the case of a "Yes" determination, at 1310, a confidence level may be determined for the predicted trait. In the case of a "No" determination, at 1309, the predicted trait may be set as "unidentified."

At 1310, a confidence level is determined for each predicted trait. For example, the confidence levels may be based on the method for predicting the trait. For example, if the name "Günter" was used to determine German as the user's primary language, the confidence level may be below maximum since "Günter" is a name used by multiple cultures. If additional words such as "Telefon" were used to determine German as the user's primary language, for example, then the confidence level may be higher due to the prediction being based on multiple sources. At 1311, a determination is made as to whether the confidence level of 1310 meets a predetermined threshold. For example, if the confidence level is below 30%, the trait may be set as "unidentified." In the case of a "Yes" determination, at 1312, the predicted trait may be stored, for example, in the trait server 122. In the case of a "No" determination, at 1318, a dynamically adjustable content item may be configured to appear in a format agnostic of trait (e.g., pictographic for language trait).

At 1313, a determination is made as to whether more traits should be determined. In the case of a "Yes" determination, 1302 may be implemented for the other traits, which may comprise gender, age, financial status, ad preferences, and/or others. In the case of a "No" determination, 1314 may be implemented. At 1314 a determination is made as to whether there are more devices for which traits can be determined. In the case of a "Yes" determination, 1302 may be implemented for the other devices. If there are multiple devices near a walk-up interface, for example, 1302 may be implemented for each of the devices. In the case of a "No" determination, at 1315, a determination is made as to whether more than one of a trait have been predicted. For example, among a plurality of devices, more than one primary language of a user may be predicted. In the case of a "Yes" determination, at 1316 traits may be ranked based on frequency, geographic location of device(s), etc. as described for FIG. 6B. In the case of a "No" determination, for example, if only one primary language is predicted, at 1317, a dynamically adjustable content item may be configured based on the predicted traits. At 1319, the dynamically adjustable content item may be transmitted may be transmitted based on the predicted traits, for example, in predicted languages, with video/audio/CC in top language, subtitles in second language, etc.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

receiving, by a first computing device, a beacon from a user device in proximity to the first computing device;

parsing content of the beacon to predict, based on language-specific characters of the beacon, traits associated with the user device;

selecting, based on the traits associated with the user device, a content item relevant to the traits; and making the content item available to a user of the user device.

2. The method of claim 1, wherein the traits associated with the user device comprise a primary language associated with the user device.

3. The method of claim 2, wherein the predicting the traits associated with the user device is further based on a confidence level indicating a degree of confidence that the primary language is accurately predicted, and wherein the confidence level is based on one or more sources indicating a name.

4. The method of claim 3, further comprising:

sending the content item with a pictographic representations of a message.

5. The method of claim 1, wherein the language-specific characters comprise one or more characters used in a device name of the user device.

6. The method of claim 1, wherein making the content item available comprises sending the selected content item to an additional computing device.

7. The method of claim 1, wherein making the content item available comprises sending the selected content item to the user device.

8. The method of claim 1, wherein the language-specific characters are associated with two or more languages, and wherein the predicting the traits associated with the user device further comprises identifying unique words, comprising the language-specific characters associated with two or more languages, associated with a language.

9. The method of claim 1, wherein the received beacon comprises a user profile indicating:

whether the user has been shown a content item; and one or more of:

a device name, a demographic characteristic of the user, an interest of the user, an advertising preference of the user, or an advertising identifier of the user.

10. The method of claim 9, further comprising:

predicting, based on the traits associated with the user device, a user trait comprising one or more of:

a gender of the user, a nationality of the user, or an interest of the user, and wherein the selecting the content item is further based on the user trait.

11. The method of claim 9, wherein the traits associated with the user device further comprise a device identifier.

12. The method of claim 1, further comprising:

predicting, based on the language-specific characters of the beacon, a first plurality of languages associated with a plurality of user devices; and ranking, based on a quantity of the plurality of user devices being associated with one or more of the predicted first plurality of languages, predicted languages of the plurality of user devices.

13. A method comprising:

receiving, by a first computing device from a user device, an identification beacon comprising data of a user profile;

identifying language-specific characters within information of the identification beacon;

predicting, based on the language-specific characters, a primary trait of a user;

selecting, based on the predicted primary trait and from a plurality of content items associated with a plurality of traits, a content item associated with the predicted primary trait; and sending, based on the predicted primary trait, the content item to the user device.

14. The method of claim 13, wherein the user profile comprises information indicating:

whether the user has been shown a content item; and one or more of:

a device name, a demographic characteristic of the user, a language of the user, an interest of the user, an advertising preference of the user, or an advertising identifier of the user.

15. The method of claim 13, wherein the user may opt in to share predetermined information in the user profile.

16. The method of claim 13, wherein the sending further comprises sending the content item, based on the predicted primary trait, to a second computing device.

17. A first computing device comprising:

one or more processors; and memory storing instructions that, when executed by the one or more processors, cause the first computing device to:

receive a beacon from a user device in proximity to the first computing device;

parse content of the beacon to predict, based on language-specific characters of the beacon, traits associated with the user device;

select, based on the traits associated with the user device, a content item relevant to the traits; and make the content item available to a user of the user device.

18. The first computing device of claim 17, wherein the traits associated with the user device comprise a primary language associated with the user device.

19. The first computing device of claim 17, wherein the language-specific characters comprise one or more characters used in a device name of the user device.

20. The first computing device of claim 17, wherein the instructions, when executed by the one or more processors, cause the first computing device to make the content item available by causing the first computing device to send the selected content item to an additional computing device.

* * * * *